May 30, 1933. E. H. KOCHER 1,911,450
LIQUID DISTRIBUTING INSTALLATION AND THE ELEMENTS THEREOF
Original Filed July 18, 1925
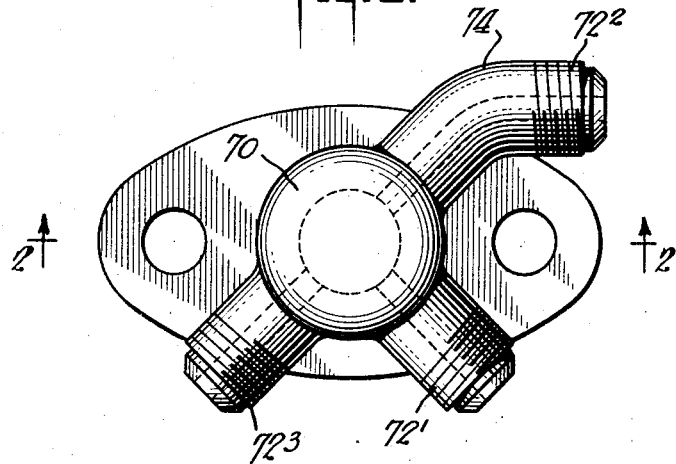
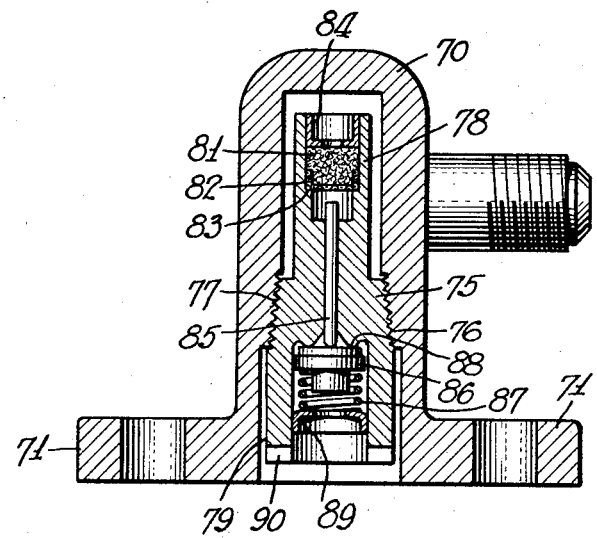
INVENTOR
*Edward H. Kocher*
BY
*his* ATTORNEYS.

Patented May 30, 1933

1,911,450

UNITED STATES PATENT OFFICE

EDWARD H. KOCHER, OF BOONTON, NEW JERSEY, ASSIGNOR TO AUTO RESEARCH CORPORATION, A CORPORATION OF DELAWARE

LIQUID DISTRIBUTING INSTALLATION AND THE ELEMENTS THEREOF

Original application filed July 18, 1925, Serial No. 44,498. Divided and this application filed October 31, 1930. Serial No. 492,507.

My present invention relates primarily to liquid feeding and distributing fittings particularly to junction fittings and flow controlling instrumentalities and while of more general application, has a preferred use in lubricating systems and a specific application to automobile chassis lubrication.

It is an object of the invention to provide a simple, inexpensive and durable junction fitting to which pipe terminals may be readily affixed which may be readily mounted upon a supporting structure, such as an automobile chassis, and which is adapted to receive and protect adequately, delicate flow controlling instrumentalities.

Another object is to provide a fitting of the above type which lends itself to ready association with the bearing structure which completely houses and protects the flow control instrumentality therein and yet affords ready access for replacement of such instrumentality when desired.

Another object is to provide a fitting of the above type, which may be associated directly to a bearing without requiring any large bored and/or tapped opening adjacent the bearing surfaces.

Another object is to provide a lubricating installation, the multi-junction elements of which are conveniently installed with definite assurance that their pipe connecting arms or nipples shall extend in proper directions when said junction element is rigidly affixed with respect to the bearings or to the carrying structure.

Other objects are in part obvious and in part pointed out hereinafter.

A feature of the present invention resides in providing a junction fitting affording communication between one or more conduits and/or a bearing structure, and having a cavity completely enclosing a flow controlling unit determining the feed to a bearing and removably fitted into said cavity, said junction fitting being adapted to be mounted directly to the fixed element of the bearing.

In a preferred embodiment of the invention, the junction fitting is provided with a tapped cavity or socket to receive a longitudinal threaded cartridge-like flow controlling instrumentality, said fitting being also desirably provided with a suitable number of pipe connecting nipples and with mounting flanges. In said embodiment the flow control instrumentality may have a central longitudinal bore substantially filled by a restriction pin, both pin and bore being of accurately predetermined almost equal diameters to impose a high resistance to flow therethrough. A valve may also be preferably associated with each flow controlling instrumentality and, if desired, normally spring seated to prevent flow except under pressure.

In the accompanying drawing in which there is shown one embodiment of several features of the present invention:

Fig. 1 is an elevation of one form of junction fitting, and

Fig. 2 is a view in longitudinal section taken along the line 2—2 of Fig. 1.

In Figs. 1 and 2 the junction fitting not only provides for direct distribution of lubricant in two or more paths, but also affords an outlet for emission of lubricant in a controlled manner to an adjacent lubricated element. This embodiment includes a dome-shaped casting 70 having a flange 71 extending at right angles from the open end thereof, the desired number of nipples 72 integrally cast with the dome-shaped member protruding generally radially from near the closed end thereof. In this instance, three such nipples $72^1$, $72^2$ and $73^3$ are shown, $72^2$ having an angle bend 74, so that its threaded end may extend generally parallel to the major axis of the flange 71 for convenient application of a pipe terminal after the fitting has been applied. Any one of the nipples may serve as the inlet and the other two as the outlets for lubricant.

Within the dome 70, I provide a flow controlling cartridge, which may be generally similar to that shown in the T fitting, disclosed in my copending application Serial No. 22,104, filed April 10, 1925. I have here shown a specifically different embodiment comprising a cartridge 75 having a pipe thread 76 intermediate its ends for coaction with the correspondingly tapped portion 77 on the side of the dome-like cavity, said cartridge being of reduced diameter at the innermost part 78 to afford a substantial clearance with respect to the inner wall of the dome.

The cartridge is provided with a socket at its innermost end within which is disposed a strainer plug 81 of felt backed preferably by a disk or cup 82 of fine wire mesh pressed against a shoulder 83 therein and held in place by a perforated cup 84 friction-fitted thereinto. The main part of the length of the cartridge is preferably provided with a longitudinal bore within which fits a metal pin 85 also of accurately predetermined diameter, affording minute clearance with respect to the bore. At the outer end, there is provided a relief valve 86 which may be pressed by a coil spring 87 against a seat 88 adjacent the end of the pin 85, said spring being held in place by a perforated friction-fitted cap 89. The outer end of the cartridge 75 is preferably provided with a fillister slot 90 which may be engaged by a screw driver for mounting the cartridge in the dome-shaped fitting.

By the expression flow controlling and obstructing instrumentality as utilized in the accompanying claims, is meant a device, which may take the form of a pipe fitting, including a valve, a restriction and/or a strainer. Under certain conditions the preferred form of flow controlling and obstructing device shown enclosed in the socket of the junction device in Fig. 2 may be modified so as to omit one or more of the flow controlling and obstructing elements shown, namely, the restriction, the strainer and/or the valve or replace them by other similarly functioning elements.

The present application is a division of application Serial No. 44,498 filed July 18, 1925.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

I claim:

1. A unitary dividing or junction fitting comprising a body including a socket for a flow controlling fitting, means near the open end of the socket for mounting the body and a plurality of radiating nipples with passages communicating with said socket said nipples being formed for attachment of pipe terminals.

2. In a lubricant distributing system, a dividing or junction arrangement comprising a unitary fitting including a socket and a plurality of radiating nipples communicating with said socket and adapted to be connected to pipe terminals and a flow controlling instrumentality enclosed in said socket, the sides of said flow controlling instrumentality being provided with means coacting with the sides of the socket to hold said flow controlling instrumentality in position within said socket.

3. A unitary dividing or junction fitting comprising a body having a dome-shaped socket and a flange adjacent the open end thereof perforated for mounting upon a supporting structure, lateral protruding unitary nipples conformed for mounting pipe terminals and having flow passages communicating with the interior of said dome-shaped socket and a flow obstructing unit secured within said socket and affording clearance near said nipples to permit flow of lubricant from one nipple to the other concurrently with flow of lubricant past the unit.

4. A restriction fitting unit for a flow controlling system comprising a casing with a longitudinal opening and a cartridge plugging said opening being threaded intermediate its ends and of reduced diameter on the inlet side of said threaded portion, said cartridge comprising a restriction pin in a longitudinal bore of slightly larger diameter, a felt strainer plug in a socket in the cartridge at the inlet end of said opening, a valve seat unitary with said cartridge near the outlet end thereof and a check valve cooperating with said seat.

5. In a central chassis lubricating system, an arrangement for connecting flow controlling devices to bearings comprising a junction member provided with a tapped cavity and rigidly connected to said bearing and an exteriorly threaded flow controlling instrumentality screwed into said tapped socket, said flow controlling instrumentality being provided with a central bore and with sockets at each end thereof communicating with said bore, the inlet socket containing a strainer and the outlet socket containing a valve.

6. In combination with a lubricating system, an arrangement for attaching a flow controlling instrumentality to a bearing structure comprising a junction member adapted to be rigidly mounted on the bearing structure and provided with a socket, said socket having an interior reduced portion and a flow controlling instrumentality enclosed within said socket having an enlarged portion cooperating with said reduced portion to hold said flow controlling instrumentality in position within said socket.

7. In combination with a lubricating system, an arrangement for mounting flow controlling instrumentalities adjacent to the bearings comprising a junction element rigidly attached to the bearing element and having a tapped socket and a flow controlling device intermediately threaded between its ends, the threaded portion of the flow controlling instrumentality screwing into the tapped socket, the portion of the flow controlling instrumentality at the inlet side of the threaded connection containing a strainer and the portion at the outlet side of the threaded connection containing a valve.

8. In combination with a lubricating system, an arrangement for attaching flow controlling instrumentalities to a bearing structure comprising a junction element rigidly attached to the bearing and having a socket closed by a portion of the bearing structure, a flow controlling cartridge unit enclosed within said closed socket having a lubricant metering passage therethrough, and being positioned in said socket in a lubricant-tight manner so as to prevent flow of lubricant to said bearing except through said metering passage, said cartridge unit containing valve, strainer and flow metering elements and means for admitting lubricant to the socket on the opposite side of that closed by the bearing structure.

9. In combination with a lubricating system having a distributing arrangement including a plurality of conduits leading to a plurality of bearing structures, a junction device establishing intercommunication between said conduits and being provided with a cavity enclosing a cartridge unit including strainer and metering means, said cartridge unit being positioned in said cavity in a lubricant-tight manner so as to prevent flow of lubricant to said bearing except past said means, one of said bearing structures supporting the device and closing said cavity.

10. As an article of manufacture, a junction element to be rigidly attached to the bearing structure and having a socket intermediately reduced and a flow controlling device including a valve and a strainer with an enlarged portion cooperating with said reduced portion of the socket to position it within the socket and extending through the socket on both sides of said reduced portion, said extensions being of such diameter as to be spaced from the walls of the socket on both sides of said reduced portion.

11. In a lubricating installation, a combined junction device and flow metering restriction plug adapted to be mounted on a bearing structure to be lubricated, said junction device being provided with a tapped longitudinal bore and having a plurality of pipe terminal connections associated with one end of said bore, the other end of said bore communicating with the bearing and said plug being threaded into said bore and serving to restrict the flow of lubricant from the pipe terminal connection end of said bore to the bearing end of said bore.

12. A unitary dividing or junction fitting comprising a casting having a dome-shaped socket and a flange unitary with the open end thereof perforated for mounting upon a supporting structure, unitary nipples protruding laterally from the portion of casting adjacent the closed inner end of the socket and conformed for mounting pipe terminals and having flow passages communicating with the interior of said dome-shaped socket, and a flow restricting unit secured within said socket and affording clearance near said nipples to permit flow of lubricant from one nipple to the other contemporaneously, with flow of lubricant past the restriction.

13. A restriction fitting unit for a flow controlling system comprising a cartridge having a rectriction pin in a longitudinal bore of slightly larger diameter, said cartridge being threaded intermediate its ends, and of reduced diameter at the inlet side of said threaded portion, a felt strainer plug in a socket at the inlet side of said socket, a valve seat unitary with said cartridge near the outlet end thereof and a relief valve spring-pressed against said seat.

14. In combination with a liquid distributing system, a socket-carrying junction member, a lubricant conduit communicating with the bottom of the socket, a flow controlling plug adapted to plug said socket provided with a substantially central liquid passageway with a socket at each end thereof communicating with said passageway, with a strainer in the inlet socket and with a valve in the outlet socket and means on the interior sides of the socket and on the mediate portion of the plug cooperating to hold the plug permanently in position.

15. A unitary dividing or junction fitting comprising a casting having a dome-shaped socket and a flange adjacent the open end thereof perforated for mounting upon a supporting structure, lateral protruding unitary nipples conformed for mounting pipe terminals and having flow passages communicating with the interior of said dome-shaped socket and a flow obstructing unit secured within said socket and affording clearance near said nipples to permit flow of lubricant from one nipple to the other concurrently with flow of lubricant past the unit, said unit including a cartridge having a restriction pin in a longitudinal bore therethrough and a check valve.

16. A restriction fitting unit for a flow controlling system comprising a casing with a longitudinal opening and a cartridge plugging said opening being threaded intermediate its ends and of reduced diameter on the inlet side of said threaded portion, said cartridge comprising a restriction pin in a longitudinal bore of slightly larger diameter, a felt strainer plug in a socket in the cartridge at the inlet end of said opening, a valve seat unitary with said cartridge near the outlet end thereof and a check valve cooperating with said seat, said cartridge having a fillister slot at its outer end for facility in threading the cartridge into position.

17. A unitary dividing or junction fitting comprising a casting having a dome-shaped socket and a flange unitary with the open end thereof perforated for mounting upon a supporting structure, unitary nipples protruding laterally from the portion of casting adjacent the closed inner end of the socket and conformed for mounting pipe terminals and having flow passages communicating with the interior of said dome-shaped socket, and a flow restricting unit secured within said socket and affording clearance near said nipples to permit flow of lubricant from one nipple to the other contemporaneously, with flow of lubricant past the restriction, the restricting unit including a cartridge having a restriction pin in a longitudinal bore therethrough and a spring-seated relief valve.

18. A restriction fitting unit for a flow controlling system comprising a cartridge having a restriction pin in a longitudinal bore of slightly larger diameter, said cartridge being threaded intermediate its ends, and of reduced diameter at the inlet side of said threaded portion, a felt strainer plug in a socket at the inlet side of said socket, a valve seat unitary with said cartridge near the outlet end thereof and a relief valve spring-pressed against said seat, the cartridge having a fillister slot at its outer end for facility in threading the cartridge in position.

19. In combination with a liquid distributing system, a socket-carrying junction member, a lubricant conduit communicating with the bottom of the socket, a flow controlling plug adapted to plug said socket provided with a substantially central liquid passageway with a socket at each end thereof communicating with said passageway, with a strainer in the inlet socket and with a valve in the outlet socket and means on the interior sides of the socket and on the mediate portion of the plug cooperating to hold the plug permanently in position, the socket of said junction member having several portions of different diameter and the portion of the socket connecting said different diameter portions cooperating with the mediate sides of the plug to hold the same in position.

20. In combination with a liquid distributing system, a socket-carrying junction member, a lubricant conduit communicating with the bottom of the socket, a flow controlling plug adapted to plug said socket provided with a substantially central liquid passageway with a socket at each end thereof communicating with said passageway, with a strainer in the inlet socket and with a valve in the outlet socket and means on the interior sides of the socket and on the mediate portion of the plug cooperating to hold the plug permanently in position, the socket of said junction member being provided with a reduction between the ends thereof and said plug being substantially entirely enclosed within said socket and extending through said socket on both sides of said reduction, the sides of the plug contacting the socket at the reduction and being spaced from the walls of the socket on both sides of said reduction.

21. In combination with a lubricating system, an arrangement for attaching flow controlling instrumentalities to a bearing structure comprising a junction element rigidly attached to the bearing and having a socket closed by a portion of the bearing structure, a flow controlling cartridge unit entirely enclosed within said closed socket having a lubricant metering passage therethrough, and being positioned in said socket in a lubricant-tight manner so as to prevent flow of lubricant to said bearing except through the metering passage and means for admitting lubricant to the socket on the opposite side of that closed by the bearing structure, said unit including a flow restriction and a valve.

22. In combination with a lubricating system having a distributing arrangement including a plurality of conduits leading to a plurality of bearing structures, a junction device establishing intercommunication between said conduits and being provided with a cavity enclosing a flow controlling cartridge unit, said cartridge unit enclosing valve and restriction instrumentaltities, and said cartridge unit being positioned in said cavity in a lubricant-tight manner so as to prevent flow of lubricant to said bearing except past said instrumentalities, one of said bearing structures supporting the device and closing said cavity.

Signed at New York in the county of New York and State of New York this 29th day of October, A. D. 1930.

EDWARD H. KOCHER.